J. E. WHITE.

Casting Stench-Traps.

No. 5,291. Reissued Feb. 18, 1873.

Witnesses

Chas. H. Smith

Geo. D. Walker

Inventor

James E. White,

Lemuel W. Serrell

Atty

AM. PHOTO-LITHOGRAPHIC CO. N.Y. (OSBORNE'S PROCESS)

UNITED STATES PATENT OFFICE.

JAMES E. WHITE, OF NEW YORK, N. Y., ASSIGNOR TO LOUIS A. CAUVET.

IMPROVEMENT IN CASTING STENCH-TRAPS.

Specification forming part of Letters Patent No. 109,786, dated November 29, 1870; reissue No. 5,291, dated February 18, 1873.

*To all whom it may concern:*

Be it known that I, JAMES E. WHITE, of the city and State of New York, have invented an Improvement in Stench-Traps, of which the following is a specification:

This invention relates to a lead trap for sewer-pipes to prevent the escape of smell. The trap is made with the usual compound bend; and the invention in question relates to a groove made at the line of union of the two sections or halves of the trap, the edges of such sections being thickened so that the joint will be strong and reliable. There is also a collar for the trap-screw cast with the other part of the trap, thereby avoiding the soldering and risk of leakage arising with traps that have a separate collar soldered to the lead.

Figure 1:
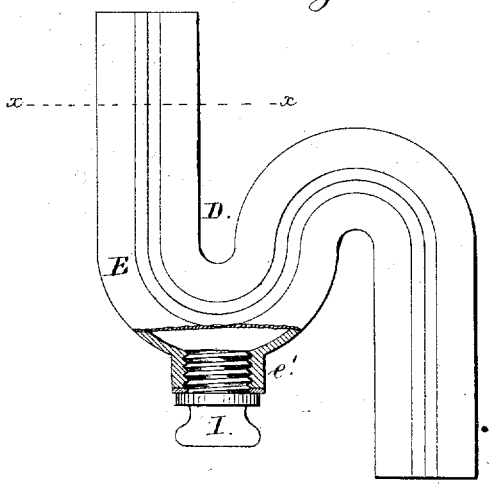
Figure 2:
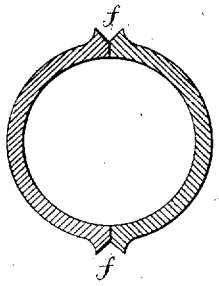
Figure 4:
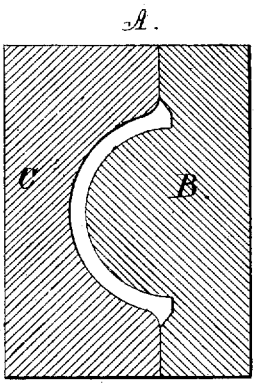
Figure 3:
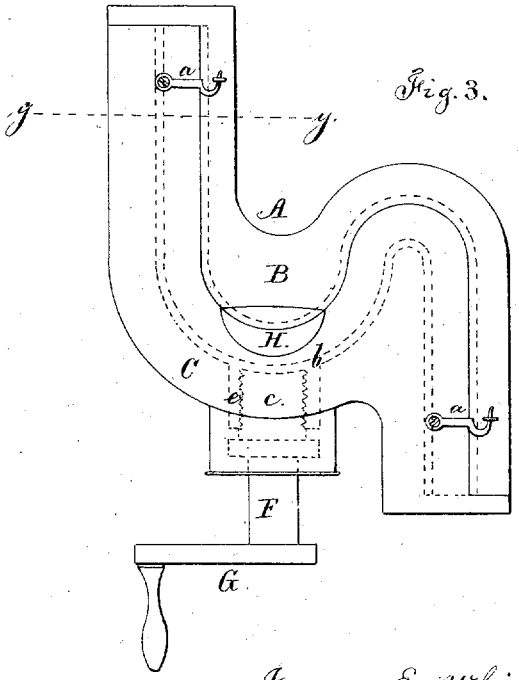

In the drawing, Figure 1 is an elevation of the trap with the screw-collar in section. Fig. 2 is a cross-section at the line *x x*. Fig. 3 is a plan of the mold, and Fig. 4 is a cross-section at the line *y y*.

The mold A, Fig. 3, for casting or constructing the lower half E of the trap, consists of two parts, B and C, fastened together by hooks *a* or other suitable devices. The part C has a semicircular concave depression or groove on its inner face, and the part B a semicircular convex corresponding projection, with their edges so shaped that when united there will be a space between them in its cross-section of the form clearly shown in Fig. 4. In that part of the mold designed to form the lower curve of the under half of the trap is a circular opening, *b*, and in this opening is placed the end *c* of a short shaft, F, arranged to turn freely, by means of a crank-handle, G, in bearings on the side of the mold, as clearly shown in Fig. 3. The end *c* of this shaft is of the requisite length to have its face on a line with and to rest against the inner face of the convex side of the mold and also of the requisite diameter to leave an annular space, *e*, about it, and has cut upon it a screw-thread, all as clearly shown in said Fig. 3. In this mold is an opening, H, for pouring in the metal to form the lower half of the trap. The parts of the mold for forming the upper half are made in the same manner, except that there is no provision made for casting it with an opening for the insertion of a screw-plug.

The molds for casting the parts of the trap are placed securely on a work-bench or table. The casting of the upper half and the removal of it from the mold are done in the usual manner; but in casting the lower half it will be seen that the metal fills the annular space about the end of the shaft F and forms a trap-screw collar, *e'*. To remove it, however, it is only necessary to turn the crank-handle G, when the screw on the shaft, turning in the thread formed about it on the interior of the opening in the casting, will at once force it from the mold, and in doing so will also perfect the screw-thread in its opening.

The parts A and B of the trap, being thus cast, are now put together, when their edges will form a groove, *f*, between them, as shown in Figs. 1 and 2, and are fastened solidly by running solder in this groove or by using the process of burning together. A screw-plug, I, is then inserted in the collar *e'*, and by its removal the trap can be cleaned.

Lead traps and bends have been cast in one piece and also in two pieces; in cases where two pieces have been used the edges have not been thickened nor a groove formed at the line of union. My construction renders the trap more reliable at the joint. Traps have been made of iron and of clay, in which there has been a tube through which the trap can be cleaned, and this tube receives a cap or plug; and in some instances a brass trap has been made in which a screw-thread has been cut to receive the trap-screw.

I am not aware of any previous instance in which the collar for the trap-screw has been cast upon the lead trap, and the same forms a new article of manufacture that is superior to the lead traps with the brass collar soldered upon the same, and much cheaper to manufacture.

I claim as my invention—

1. The trap or bend made with the groove

*f* on the line of union of the sections or halves of the trap between the projections along the edges, substantially as set forth.

2. The collar *e'* of lead cast with the other portion of the trap or bend, substantially as set forth.

3. A mold for casting soft-metal traps containing a threaded core around which the lead collar is cast substantially as set forth.

Signed by me this 19th day of November, A. D. 1872.

JAMES E. WHITE.

Witnesses:
E. K. WILDER,
R. A. LINDSAY.